(No Model.)
J. COURSON.
ATTACHMENT FOR GRAIN DRILLS.
No. 340,103. Patented Apr. 20, 1886.
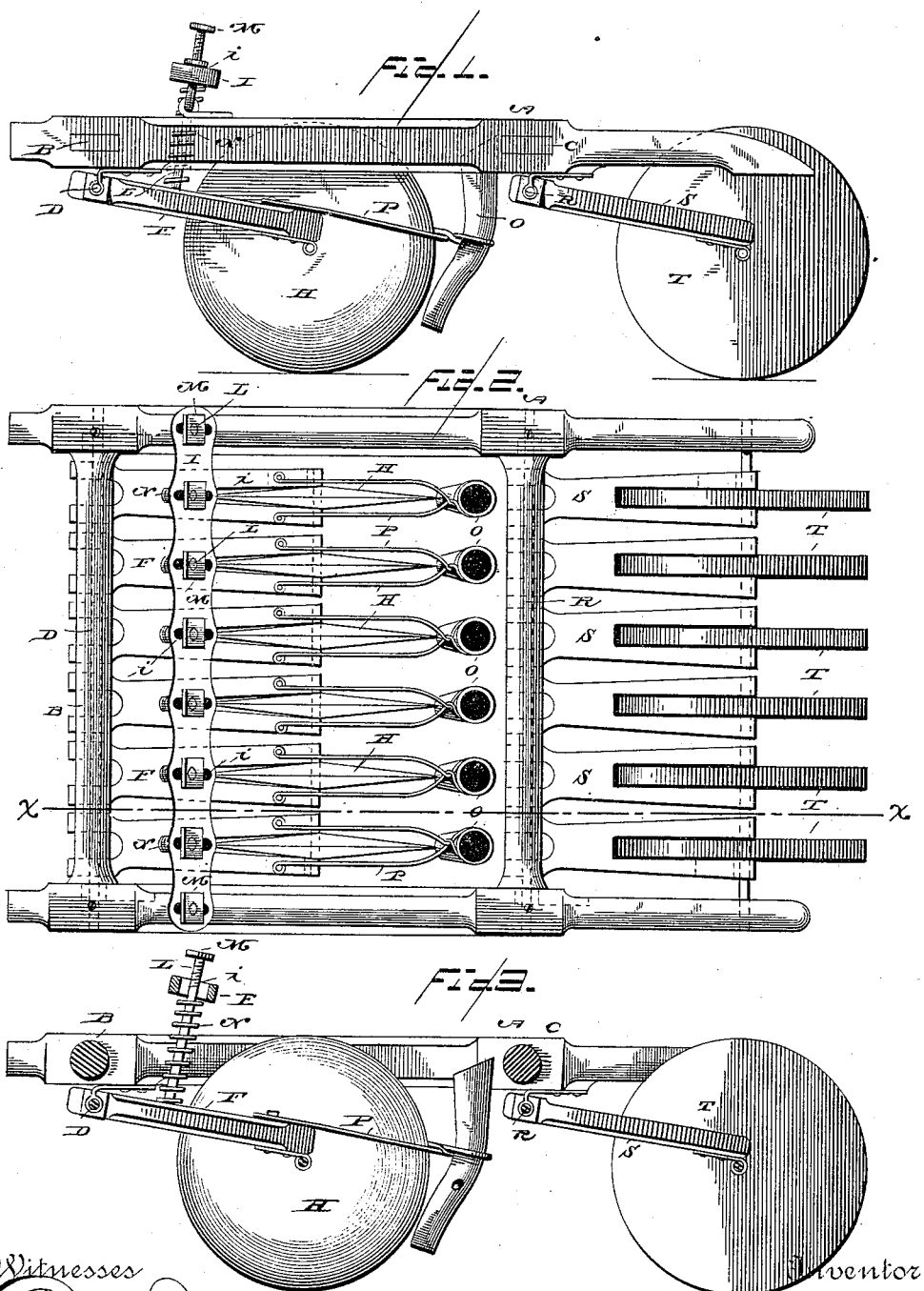
Witnesses
Inventor
J. Courson.
By his Attorneys

United States Patent Office.

JERMIAH COURSON, OF PRAIRIE VIEW, KANSAS.

ATTACHMENT FOR GRAIN-DRILLS.

SPECIFICATION forming part of Letters Patent No. 340,103, dated April 20, 1886.

Application filed December 30, 1885. Serial No. 187,152. (No model.)

*To all whom it may concern:*

Be it known that I, JERMIAH COURSON, a citizen of the United States, residing at Prairie View, in the county of Phillips and State of Kansas, have invented a new and useful Improvement in Attachments for Grain-Drills, of which the following is a specification, reference being had to the accompanying drawings.

My invention relates to an improvement in attachments for grain-drills; and it consists in the peculiar construction and combination of devices, that will be more fully set forth hereinafter, and particularly pointed out in the claims.

In the drawings, Figure 1 is a side elevation of my invention. Fig. 2 is a top plan view of the same. Fig. 3 is a vertical longitudinal sectional view on the line $x$ $x$ of Fig. 2.

A represents a rectangular frame, which is adapted to be attached to any ordinary grain-drill and has cross-bars B and C. Below the bar B is a transverse rod, D, on which is journaled a series of beams, F, the rear ends of which are bifurcated, and to each of the said arms, at its rear end, is journaled a circular colter or furrow-opener, H.

I represents a transverse rocking bar, which is hinged on the upper side of the frame A, near the front end thereof, and is provided with a series of openings, $i$, one of the said openings being above each of the beams F. Rods L are secured to the beams F and extend up through the openings $i$, and on the upper ends of these rods, which are preferably screw-threaded, are nuts M, which bear upon the upper side of the bar I and limit the downward play of the beams. Coiled extensile springs N are placed on the rods L, and bear between the lower side of the bar I and the upper side of the beams F.

O represents a series of discharge-nozzles, which are connected to the lower end of the flexible grain-tubes, with which the ordinary grain-drills are provided, and the said discharge-nozzles are secured to the rear ends of the beams F slightly in rear of the revolving colters or furrow-openers by means of rods P. By this construction it will be readily understood that each of the furrow-openers and discharge-nozzles is free to rise or lower independently of the others, so that when the machine is being drawn along the said colters and nozzles will rise and fall to accommodate themselves to any unevenness in the ground. The colters open the furrows in advance of the discharge-nozzles, and the said nozzles discharge the seeds in the furrows thus formed.

Below the cross-bar C is a transverse rod, R, which is similar to the rod D, and on the said rod R is hinged a series of rocking beams, S, each of which carries a revolving wheel, T, having a broad tread. These beams S and wheels T are also free to rise and fall independently of each other, and the said wheels are trailed in rear of the discharge-nozzles, and serve the purpose of covering or rolling the seeds deposited in the furrows made by the revolving furrow-openers.

By means of this invention grain may be drilled readily on even or uneven ground.

A grain-drill attachment thus constructed is cheap and simple, is not likely to get out of order, and can be drawn much more easily than the ordinary grain-drills having hoes to open the furrows, as the colters and covering-wheels rotate easily when the machine is moved.

Having thus described my invention, I claim—

1. The combination of the frame, the transverse rocking bar I thereon, having the slotted openings $i$, the beams F, hinged to the frame, and carrying the trailing colters and the discharge-nozzles, and the rods L, attached to the hinged beams and passing up through the openings in the rocking bar, substantially as described.

2. The combination of the frame, the transverse rocking bar I thereon, having the slotted openings $i$, the beams F, hinged to the frame, and carrying the trailing colters and the discharge-nozzles, the rods L, attached to the hinged beams, the bearing-springs on the said rods, and the nuts M on the upper ends of the rods L, for the purpose set forth, substantially as described.

In testimony that I claim the foregoing as my own I have hereto affixed my signature in presence of two witnesses.

JERMIAH COURSON.

Witnesses:
A. F. WALKER,
A. C. BUFFINGTON.